March 28, 1961 L. J. HOFFMAN ET AL 2,977,560
CONTROL APPARATUS
Filed Dec. 30, 1958 3 Sheets-Sheet 1

WITNESSES:
Bernard R. Gieguey
E. Herbert Liss

INVENTORS
Lester J. Hoffman and
William J. Frederick.
BY
A. T. Stratton
ATTORNEY March 28, 1961 L. J. HOFFMAN ET AL 2,977,560
CONTROL APPARATUS
Filed Dec. 30, 1958 3 Sheets-Sheet 3

United States Patent Office 2,977,560
Patented Mar. 28, 1961

2,977,560

CONTROL APPARATUS

Lester J. Hoffman, Penn Hills, and William J. Frederick, Turtle Creek, Pa., assignors to Westinghouse Electric Corporation, East Pittsburgh, Pa., a corporation of Pennsylvania Filed Dec. 30, 1958, Ser. No. 783,740

4 Claims. (Cl. 338—67)

The present invention relates generally to control apparatus for accelerating and braking a dynamoelectric machine, and more particularly to control apparatus for controlling the acceleration of electrically propelled vehicles.

In accordance with the teaching of the prior art, the acceleration of electrically propelled vehicles has been controlled by connecting resistors in series with the propelling motors of the vehicles in order to control the voltage and current supplying the motors. The resistors are shunted from the motor circuits step by step by means of controllers sometimes referred to as accelerators. The prior art controllers or accelerators are provided with a drum type switch having a plurality of contact fingers which engage a circular bus bar by means of a spring loaded roller. The actuating roller is carried on a rotating arm which may be driven by a pilot motor. The resistor sections are carried by the accelerator about the periphery of the circular bus bar. An example of such an accelerator is more fully described in Patent No. 1,991,229 to Lynn G. Riley issued February 12, 1935, and assigned to the assignee of the present invention.

These circular accelerators are satisfactory but are limited in the number of resistors that can be located about the periphery of a practicable sized unit. The resistor units become quite hot during operation and usually require external blower units for cooling. For adequate cooling a very large diameter circular accelerator unit would require a number of blower units spaced circumferentially around the unit.

It would therefore be desirable to provide an accelerator having resistance units extending longitudinally as well as having the contactor elements extending longitudinally. Such an accelerator lends itself to more general application. The accelerator can be supplied with additional amounts of resistance, by changing only the length of the accelerator. Since linear motion of the actuator means for actuating the contactors would be required, a linear type driving means would be required. Since these accelerators are usually utilized in applications where they are subject to large accumulations of dirt and other foreign matters it is, therefore, essential that a drive for a linear accelerator be provided which is not sensitive to dirt accumulation and which will operate satisfactorily under these conditions. A linear type accelerator can be cooled much more easily than the circular type.

The principal object of the present invention is to provide improved acceleration control apparatus which may include an increased number of resistance steps and which is efficient in operation and economical to manufacture.

Another object of the invention is to provide an accelerator control apparatus in which the contactors and resistor elements are arranged in longitudinal alignment and in which additional steps may be added by increasing only the length of the unit.

A further object of the invention is to provide improved accelerator control apparatus in which the contactors and resistor elements are arranged in longitudinal columns in such a manner that improved cooling of the resistors may be effected and which can include more steps of resistance in a given area than conventional circular accelerators.

A still further object of the invention is to provide improved control apparatus for acceleration of propelling motors in which resistor elements and contactors are longitudinally arranged and in which the contactor actuators are mounted on a carriage which is chain driven.

Other objects and advantages of the invention will be apparent from the following detailed description taken in conjunction with the accompanying dawings, in which.

Figure 1:
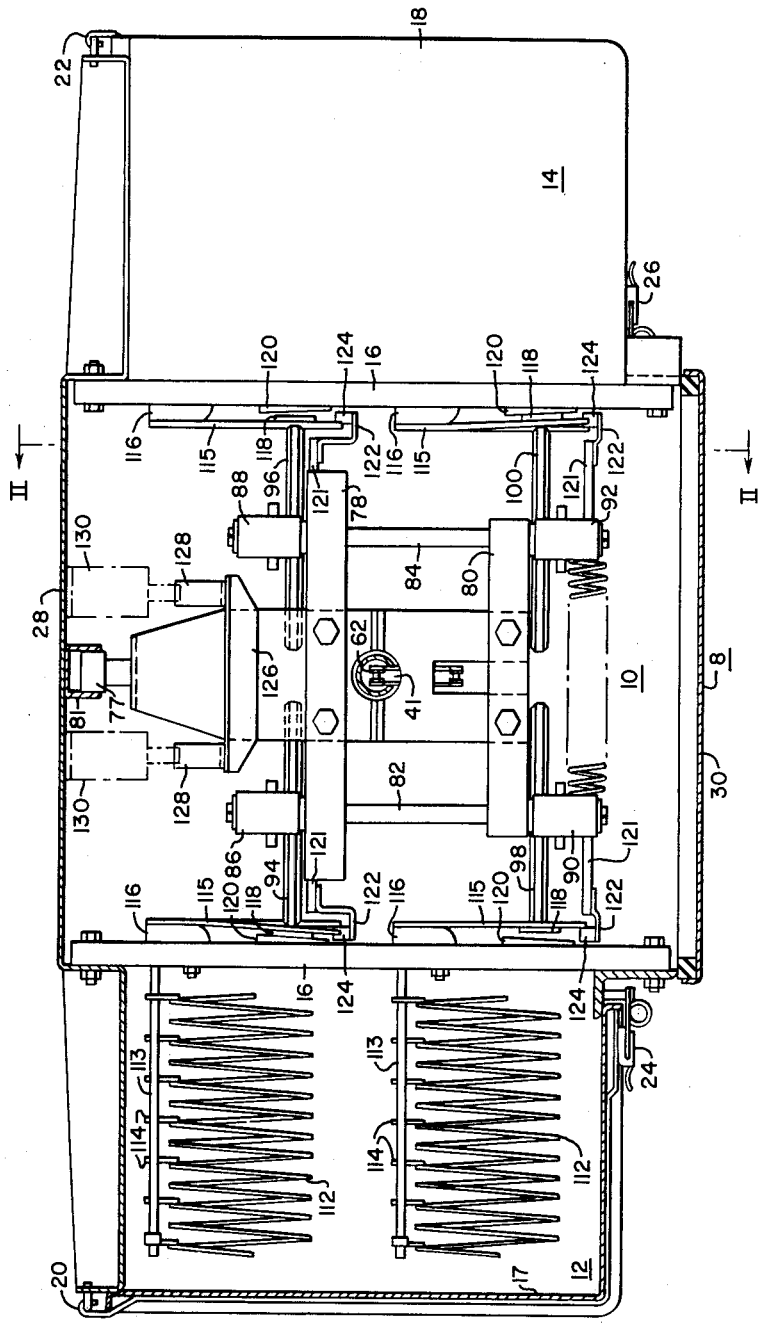
Figure 1 is a rear elevational view of control apparatus embodying the invention with parts broken away.
Figure 2:
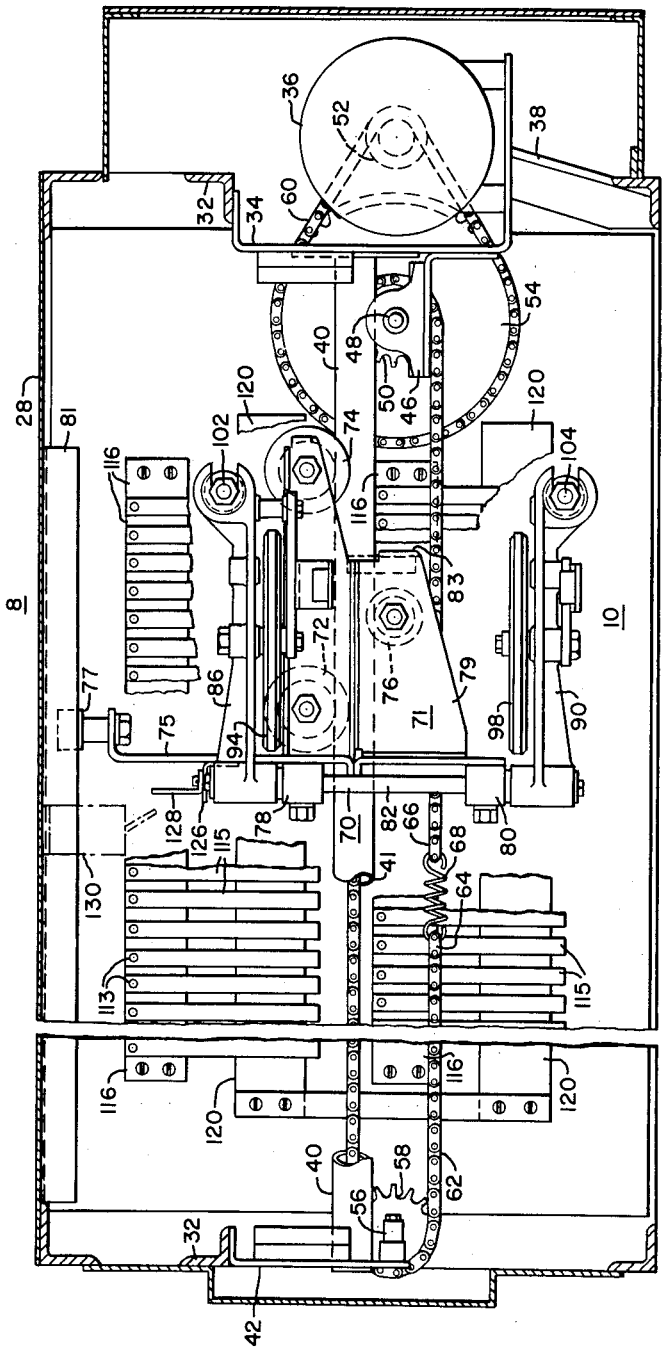
Fig. 2 is a longitudinal sectional view taken generally along line II—II of Fig. 1.
Figure 3:
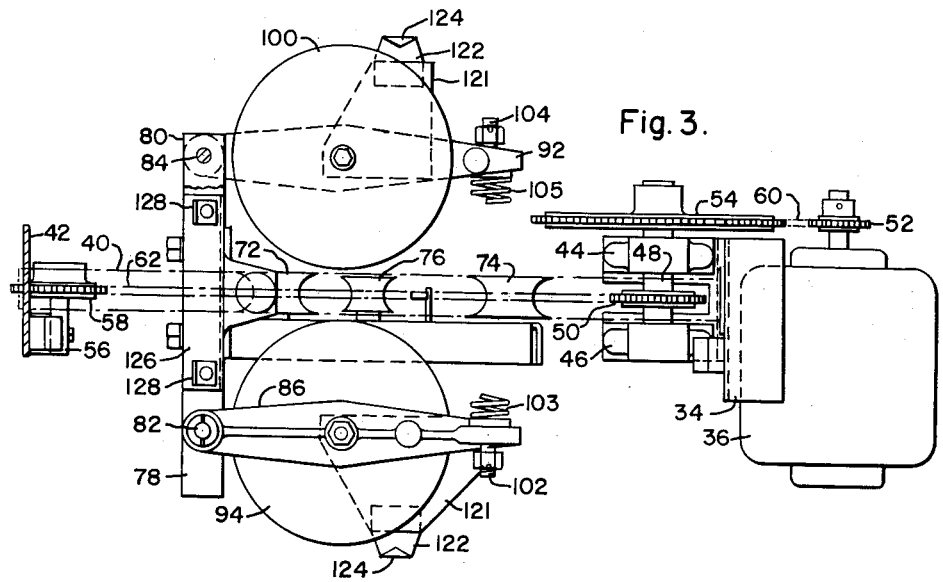
Fig. 3 is a top plan view of the carriage, contact rollers and drive mechanism of this invention.
Figure 4:
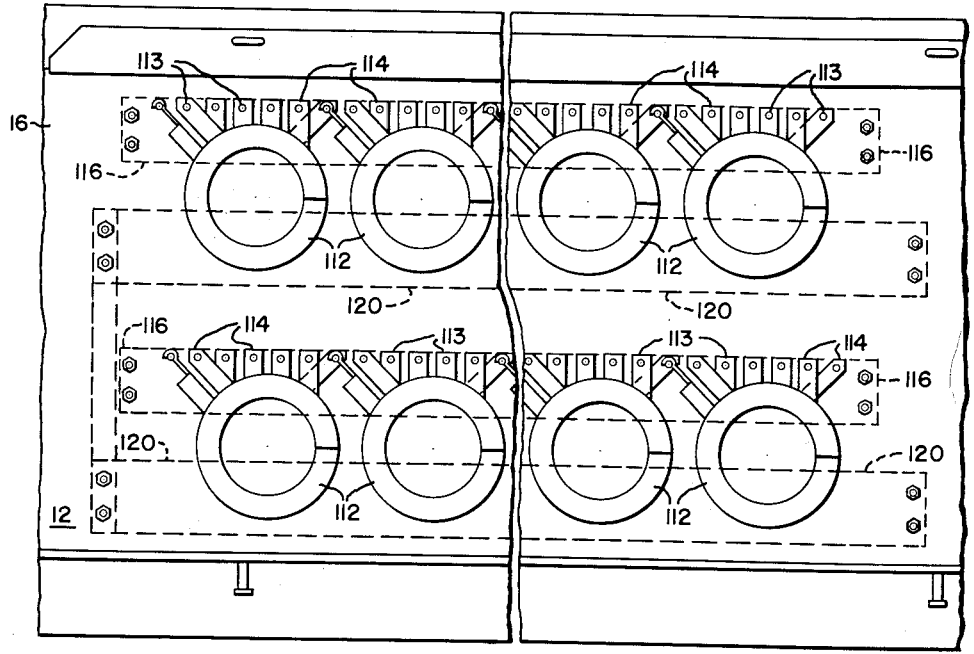
Fig. 4 is a side elevational view of the apparatus with the resistor compartment cover removed.

Referring now to the drawings, the accelerator illustrated is enclosed by a housing assembly 8 including a central carriage compartment 10 and side resistor compartments 12 and 14 on each side of the central compartment 10. Each of the resistor compartments 12 and 14 has a common side wall 16 with carriage compartment 10 of insulating material. The side walls and bottoms of the resistor compartments 12 and 14 are each enclosed by L-shaped cover members 17 and 18, respectively. One leg of each of the L-shaped cover members encloses a side of its associated resistor compartment and the other leg encloses the bottom thereof. The covers 17 and 18 are hinged at the upper end of the housing as by hinges 20 and 22, respectively, and are held closed by latches 24 and 26, respectively, at the lower inside corners. The housing assembly 8 has a top cover plate 28 which closes the tops of the central and side compartments. The central carriage compartment is closed at its bottom by a cover plate 30.

On each end of the central compartment 10 transverse supporting bars 32 extend from one side wall 16 to the opposite side wall. At the front end secured to the bar 32 is an L-shaped supporting bracket 34. The horizontal arm of the bracket 34 extends outward from the housing 8 and constitutes a support for a pilot motor 36. A reinforcement strip 38 extends between the bottom of compartment 10 and the horizontal portion of bracket 34 to provide strengthening for the motor support. A carriage guide shaft or supporting tube 40 is disposed centrally in the central compartment 10 and is supported at one end by the vertical portion of bracket 34. The guide shaft 40 is supported at its other end by a bracket 42 secured to the rear transverse bar 32. The guide shaft 40 extends longitudinally from one end of the central compartment 10 to the other. Guide shaft 40 has a longitudinal slot 41 extending for the entire length of the guide shaft at the bottom thereof. A pair of sprocket shaft journals 44 and 46 are carried by the vertical portion of bracket 34. A sprocket shaft 48 is supported for rotation within the journals 44 and 46. Mounted on the shaft 48 is a chain sprocket 50 having its upper portion extending within slot 41 of guide shaft 40. A motor sprocket 52 is secured to the shaft of the pilot motor 36. In alignment with sprocket 52 mounted on sprocket shaft 48 is a driven sprocket 54. An idler sprocket bracket 56 is carried by the rear transverse bar 32. An idler sprocket 58 is rotatably carried by the rear idler sprocket bracket 56 and a portion of the idler sprocket 58 extends into the slot 41 of the guide shaft 40. A driving chain 60 connects motor sprocket 52 and driven sprocket 54. A carriage chain 62 extends between the chain or carriage sprocket 50 and the idler sprocket 58 through the guide shaft 40. The ends 64 and 66 of the chain 62 are connected by a resilient means, such as a coil spring shown at 68. When the pilot motor 36 is running, motor sprocket 52 drives sprocket 54 through chain 60 which turns sprocket shaft 48. This in turn turns chain sprocket 50 which drives carriage chain 62 about idler sprocket 58 and chain sprocket 50. A carriage assembly 70 is supported on guide shaft 40 by three rollers 72, 74 and 76 mounted on a horizontal axis for rotation and by a fourth guide roller 77 mounted for rotation on a horizontal axis and within a track 81. Two of the rollers 72 and 74 ride on the upper surface of the guide shaft 40 and the third roller 76 rides on the lower surface of the guide shaft 40. The carriage includes an upper and lower base member 78 and 80. Base members 78 and 80 are secured together by vertical rods 82 and 84 at each end thereof. A guide roller supporting assembly 71 is provided for carrying rollers 72, 74, 76 and 77. Guide roller supporting assembly 71 includes a vertical leg 75 secured to upper and lower base members 78 and 80, respectively, and extending upwardly to a point adjacent top cover plate 28 and a horizontal leg 79 intermediate the upper and lower base members and extending rearwardly toward the pilot motor 36. Rollers 72 and 74 are rotatably mounted on leg 79 and spaced longitudinally. Rollers 72 and 74 are adapted to ride on the upper surface of guide shaft 40. Roller 76 is rotatably mounted on horizontal leg 79 intermediate and below rollers 72 and 74. Roller 76 is adapted to ride on the lower surface of guide shaft 40.

It can be seen that the rollers 72, 74 and 76 constrain the carriage to movement longitudinally on guide shaft 40. In order to prevent rotation of the carriage about its guide shaft 40, guide roller 77 is mounted for rotation on a vertical axis at the upper end of vertical leg 75 of frame 73. Guide roller 77 is received in a guide track 81. Track 81 is a U-shaped member having its base secured to the top cover plate 28 centrally of central housing 10.

Pivotally secured to rods 82 and 84 at each end are arms 86, 88, 90 and 92 which carry contact rollers 94, 96, 98 and 100, respectively, of insulating material. The arms 86, 88, 90 and 92 have bifurcated open end portions. The open portions of upper arms 86 and 88 are in alignment and the open portions of lower arms 90 and 92 are in alignment with each other. A rod 102 and a rod 104 extend between the upper arms 86 and 88 and the lower arms 90 and 92 respectively, and into their respective bifurcations. The arms 86, 88, 90 and 92 are slidable on the rods 102 and 104. A coil spring 103 receives rod 102. The spring extends between the bifurcations on the free ends of the arms 86 and 88 and biases them outwardly. A similar coil spring 105 is received on rod 104. The rollers 94, 96, 98 and 100 are rotatably supported with their axis substantially at the midpoint of their respective arms. Thus, it can be seen that there are a pair of upper and a pair of lower rollers rotatably supported on arms, which arms are pivotally supported at one end and spring biased outwardly at the other end. A projection 83 on horizontal arm 79 of guide roller assembly frame 71 extends into slot 41 of guide shaft 40 and is connected to carriage chain 62. Thus, the entire carriage assembly 70 is fixedly secured to carriage chain 62 and moves therewith.

It can thus be seen that movement of the carriage along the guide shaft 40 is effected by operation of the pilot motor 36 which drives sprocket 54. Sprocket 54 through sprocket 48 and chain sprocket 50 in turn drives carriage chain 62. The carriage is secured to carriage chain 62 and travels along the guide shaft as the chain is moved. The rollers 72, 74 and 76 support the carriage on the guide shaft and the upper guide roller 77 traveling in the track 81 prevents rotation of the carriage on the guide shaft 40. The carriage may move reciprocally on the guide shaft 58 by reversal of the motor at each end of the carriage travel.

Within the resistance compartments 12 and 14 are carried a plurality of resistance coils 112 connected in series. The resistance coils 112 in each compartment are aligned in an upper row and a lower row extending longitudinally of the resistance housings and have their axis extending transversely of the resistance housing. It can be seen that this provides four rows of resistors. In the embodiment illustrated there are six resistance coils 112 in each row, but it will be understood that any suitable number may be used. Each resistor has a plurality of terminal lugs 114 at spaced points thereon. Each lug locates the end of a resistance step. A conducting rod 113 extends from each terminal lug 114 through insulating side walls 16 to a terminal board 116 on the interior of compartment 10.

Secured to each of the side walls 16 within the carriage housing 10 are upper and lower bus bars 120. An upper and a lower bus bar 120 is secured to each of the walls 16 and extends from the front to the rear of the housing. The bars 120 are all parallel to each other. Each bar 120 is disposed so as to be in the path of one of the contact rollers 94, 96, 98 or 100. As shown in the drawings each resistor 112 has six terminal lugs and six rods extending therefrom. Any suitable number may of course be provided. For each rod a contactor 118 is secured to the terminal board. The contactors 118 are aligned in four rows longitudinally along the interior of the carriage housing wall 16. They are electrically connected to the rods 113 and are resiliently mounted by means of leaf springs 115. They are positioned in the path of the contact rollers to engage bus bars 120 when actuated by one of the actuating rollers 94, 96, 98 or 100. As the rollers pass they bias the contactors 118 into engagement with the adjacent bus bars 120 thereby shunting a portion of the resistance. The contactors 118 on opposite sides of the carriage housing 10 are so arranged that the center of a contactor on one side wall 16 lies opposite the space between two contactors on the opposite side wall 16. Therefore, each pair of upper rollers 94 and 96 and each pair of lower rollers 96 and 98 bias only one contactor 118 on one side wall into engagement with its adjacent bus bar 120 at any given instant so that a single resistance step is shunted.

Mounted on each of the roller support arms 86, 88, 90 and 92 is an outwardly extending bracket 121 which extends outwardly toward the contactors and which carries at its outermost end a contact clearing kickout element 122. Kickout element 122 carries an upturn wedged-shaped lug 124. Should any of the contactors 118 stick to the bus bar 120 after the contact rollers pass by that contactor, the kickout element 124 will disengage the contactor from the bus bar 120.

A transverse arm 126 is carried by support vertical leg 75 of the guide roller frame 73, intermediate roller 77 and upper base member 78. Carried by transverse arms 126 is a trip lug 128 which cooperates with interlock trip switches 130. A plurality of trip switches or interlocks 130 extend downwardly from the top cover plate 28 of the central housing 10 in the path of trip lug 128. These trip switches serve various purposes in the control circuits of the propelling motor. One of these trip switches may serve as a reversing switch at each end to reverse the pilot motor of the accelerator at the end of the path of the carriage. As the carriage moves along its path the trip lug 128 engages the various trip switches 130 which lie in its path.

It can be seen by the above description that a large number of steps can be provided in a linear type accelerator described herein. As many steps as desired may be provided by merely lengthening the guide shaft 40 and the carriage chain 60. Additional steps may also be provided by extending the length of the coil resistors and providing more steps on each resistor 120. Spacewise it can be seen that this is a very economical construction. In order to cool the resistors a blower can be placed at the end of each resistor housing. The heat can be efficiently removed in this manner with the use of only two blowers regardless of the length of the accelerator. The air can be efficiently directed toward the resistors. This is advantageous and preferable to the circular type of accelerator in this respect. Other means of driving the carriage can be used but would not be as desirable as the chain drive. For example, a ball bearing screw assembly may be used but such an assembly would invite serious trouble by accumulation of dirt on the screw assembly. The chain drive can be operated without difficulties even through much dirt and foreign materials accumulate on the chain drive.

The operation of the accelerator should be clear from the above description. The pilot motor 36 through sprockets 52, 54 and 50 and carriage chain 62 drives the carriage longitudinally along the guide shaft 40. The actuating rollers 94, 96, 98 and 100 are carried by the carriage and biased into engagement with the contactors 118. As the carriage travels in its longitudinal path the contactors 118 are successively pressed into engagement with the bus bar 120. Each contact member 118 is connected to a section of a resistor 112. Therefore, the bus bar 120 and the resistors 112 may be so connected in an electrical circuit that the resistor elements will be shunted from the circuit step by step when the carriage is driven along the row of contact members 118 thereby decreasing the amount of resistance in the electrical circuit. The operation of the pilot motor 36 may be controlled to stop the carriage at any desired position and the rate of travel of the carriage may be varied by varying the speed of the motor 36. In this manner the rate of acceleration of the propelling motors of an electrical operated vehicle may be readily controlled.

From the foregoing description it will be apparent that a control apparatus has been provided which is particularly adapted for controlling the acceleration of the propelling motors of electrical vehicles such as rapid transit cars, although it is not limited to controlling motors of this type. Since a large number of resistor steps may be provided, smooth acceleration necessary for the comfort of the passengers in the vehicle is obtained. The chain drive employed is not subject to failure by accumulation of dirt. This is a desirable feature in this type of apparatus. The apparatus herein described is relatively light in weight and compact thereby occupying a small amount of space in a vehicle. A particular embodiment of the invention has been shown and described for the purpose of illustration, but it will be apparent that other embodiments and modifications are possible within the scope of the invention. Thus, for example, a belt drive may be substituted for a chain drive or a spring biased chain or belt mechanism may be used which need not employ a reversible pilot motor. Similarly, numerous other modifications and embodiments will be apparent to those skilled in the art and all such modifications and embodiments are within the scope of the invention.

We claim as our invention:

1. In a control system the combination comprising an elongated carriage supporting element, a carriage supported on said element for longitudinal movement thereon, a plurality of current carrying elements connected in series, a stationary bus bar disposed parallel to said supporting element, a plurality of resiliently mounted contact members each having a fixed portion electrically connected to one of said current carrying elements and a transversely movable portion, said transversely movable portions disposed in longitudinal alignment along said bus bar to engage the bus bar to shunt said current carrying elements, a contact engaging means supported on said carriage element and movable therewith for successively actuating said contact members into engagement with said bus bar, means mounted on said carriage for positively disengaging said contact members from said bus bars, and longitudinally movable means connected to said carriage for effecting longitudinal movement of said carriage.

2. In a control system the combination comprising an elongated carriage supporting element, a carriage supported on said element for longitudinal movement thereon, a plurality of current carrying elements connected in series, a stationary bus bar disposed parallel to said supporting element, a plurality of resiliently mounted contact members each having a fixed portion electrically connected to one of said current carrying elements and a transversely movable portion, said transversely movable portions disposed in longitudinal alignment along said bus bar to engage the bus bar to shunt said current carrying elements, a contact engaging means supported on said carriage element and movable therewith for successively actuating said contact members into engagement with said bus bar means mounted on said carriage for positively disengaging said contact members from said bus bar, and a driven chain secured to said carriage for effecting longitudinal movement of said carriage.

3. In a control system, the combination comprising an elongated carriage supporting element, a carriage supported on said element for longitudinal movement thereon, a plurality of resistors connected in series, each of said resistors having a plurality of tapped terminals, said resistors disposed in a compartment and arranged in longitudinally extending rows, each of said terminals constituting a resistance step, a stationary bus bar disposed parallel to said supporting element, a plurality of resiliently mounted contact members each having a fixed portion electrically connected to one of said tapped terminals and a transversely movable portion, said transversely movable portions disposed in longitudinal alignment along said bus bar to engage the bus bar to shunt portions of said resistors, a contact engaging means supported on said carriage element and movable therewith for successively actuating said contact members into engagement with said bus bar, means mounted on said carriage for positively disengaging said contact members from said bus bar, and a driven chain secured to said carriage for effecting longitudinal movement of said carriage.

4. In control apparatus, the combination comprising an elongated carriage supporting element, a carriage supported on said element for longitudinal movement thereon, a plurality of resistors connected in series, each of said resistors having a plurality of tapped terminals, each of said terminals constituting a resistance step, a pair of stationary bus bars disposed parallel to said supporting element and on opposite sides thereof, a plurality of resiliently mounted contact members disposed in longitudinal alignment along each of said bus bars, each of said contact members having a fixed portion electrically connected to one of said tapped terminals and a transversely movable portion to engage the adjacent bus bar to shunt portions of said resistors, a pair of contact engaging means supported on said carriage element and movable therewith for successively actuating each of said contact members into engagement with its adjacent bus bar and means mounted on said carriage for positively disengaging said contact members from said bus bars, and a driven chain secured to said carriage for effecting longitudinal movement of said carriage.

References Cited in the file of this patent

UNITED STATES PATENTS

| | | |
|---|---|---|
| 1,231,632 | Miller et al. | July 3, 1917 |
| 1,414,709 | Reisbach | May 2, 1922 |